US007129828B2

(12) United States Patent  (10) Patent No.: US 7,129,828 B2
Cook  (45) Date of Patent: Oct. 31, 2006

(54) ENCAPSULATED SURFACE ACOUSTIC WAVE SENSOR

(75) Inventor: James D. Cook, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 149 days.

(21) Appl. No.: 10/895,786

(22) Filed: Jul. 20, 2004

(65) Prior Publication Data

US 2006/0017553 A1   Jan. 26, 2006

(51) Int. Cl.
*B60C 23/00* (2006.01)
(52) U.S. Cl. ............... 340/447; 73/146.4; 73/146.5; 340/445
(58) Field of Classification Search ............ 340/442, 340/443, 447, 505, 445; 73/702, 146.2, 146.4, 73/146.5
See application file for complete search history.

(56) References Cited

U.S. PATENT DOCUMENTS

| 3,706,094 | A | * | 12/1972 | Cole et al. ............... 342/44 |
| 4,216,401 | A | | 8/1980 | Wagner ............... 310/313 R |
| 4,454,440 | A | | 6/1984 | Cullen ............... 310/313 R |
| 4,978,941 | A | | 12/1990 | Brown ............... 340/447 |
| 5,289,160 | A | * | 2/1994 | Fiorletta ............... 340/447 |
| 5,821,425 | A | | 10/1998 | Mariani et al. ............... 73/703 |
| 6,079,276 | A | | 6/2000 | Frick et al. ............... 73/718 |
| 6,137,708 | A | * | 10/2000 | Lin et al. ............... 365/51 |
| 6,218,936 | B1 | | 4/2001 | Imao ............... 340/447 |
| 6,259,360 | B1 | | 7/2001 | Takamura ............... 340/445 |
| 6,293,136 | B1 | | 9/2001 | Kim ............... 73/19.03 |
| 6,314,791 | B1 | | 11/2001 | Rapp et al. ............... 73/24.06 |
| 6,450,021 | B1 | | 9/2002 | Katou et al. ............... 73/146.5 |
| 6,484,585 | B1 | | 11/2002 | Sittler et al. ............... 73/718 |
| 6,571,638 | B1 | * | 6/2003 | Hines et al. ............... 73/702 |
| 6,640,613 | B1 | | 11/2003 | Rapp et al. ............... 73/24.01 |
| 6,760,454 | B1 | * | 7/2004 | Shreve et al. ............... 381/110 |
| 6,954,144 | B1 | * | 10/2005 | Kiser et al. ............... 340/539.26 |
| 6,978,668 | B1 | * | 12/2005 | Starinshak ............... 73/146 |
| 2002/0117005 | A1 | | 8/2002 | Vile et al. | |
| 2003/0089451 | A1 | | 5/2003 | Koch | |

* cited by examiner

*Primary Examiner*—Brent A. Swarthout
(74) *Attorney, Agent, or Firm*—Kermit D. Lopez; Matthew F. Lambrinos

(57) ABSTRACT

Sensor package systems and methods are disclosed, which include a quartz sensor package encapsulated by an overmold material. A surface acoustic wave sensing element and one or more bonding pads can be integrated with the quartz sensor package. Additionally, one or more antennas can be respectively bonded to the quartz sensor package at the bonding pads, such that the antennas communicates electrically with the surface acoustic wave sensing element and permits wireless interrogation of the quartz sensor package including the surface acoustic wave sensing element from an external wireless source.

15 Claims, 3 Drawing Sheets

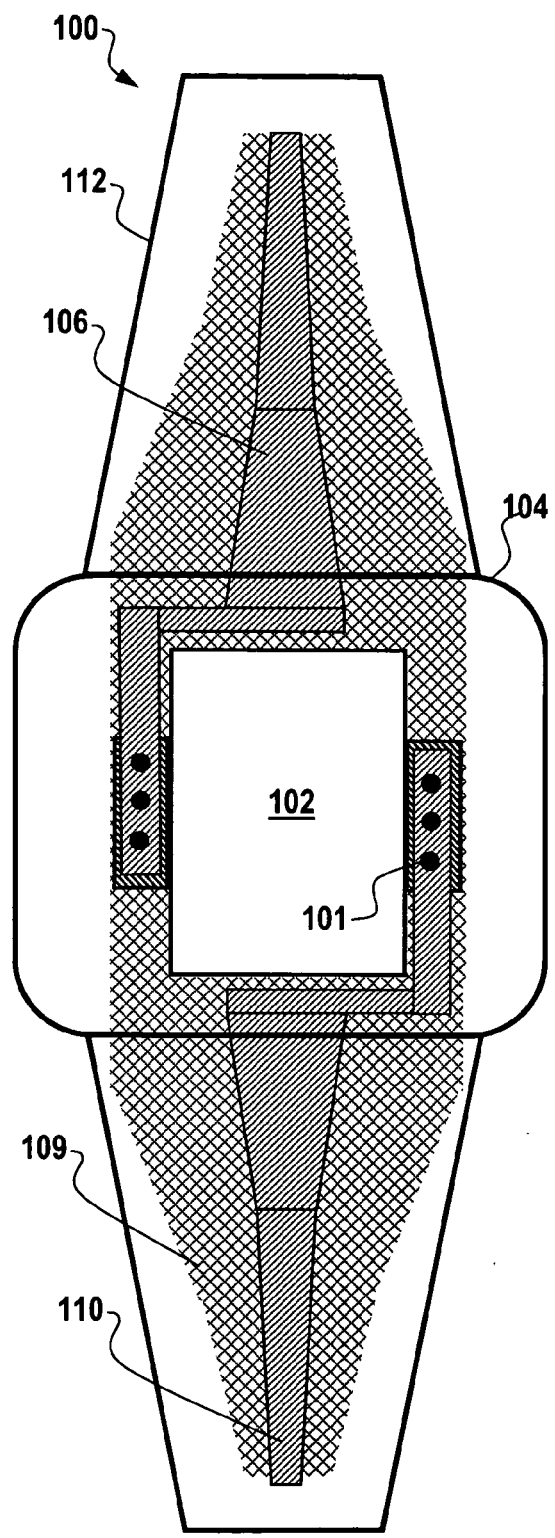
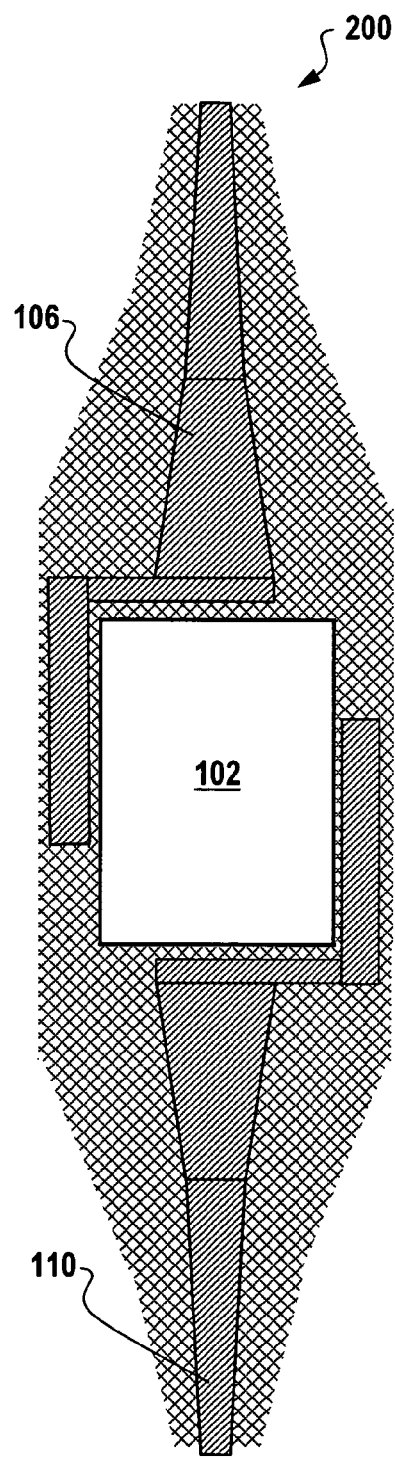
Fig. 1
Fig. 2

ENCAPSULATED SURFACE ACOUSTIC WAVE SENSOR

TECHNICAL FIELD

Embodiments are generally related to sensor devices, methods and systems. Embodiments are also related to surface acoustic wave (SAW) devices. Embodiments are additionally related to tire air pressure and temperature sensing applications.

BACKGROUND OF THE INVENTION

Various sensors are known in the pressure and temperature sensing arts. The ability to detect pressure and/or temperature is an advantage to any devices which are under variable temperature conditions, which can be severely affected by these conditions. An example of such a device is an automobile tire, which of course, experiences variations in both temperature and pressure. Many different techniques have been proposed for sensing the pressure and/or temperature in tires, and for delivering this information to the operator at a central location on the vehicle so that he knows that a tire is at low or high air pressure.

Such sensors generally communicate with the vehicle so that the sensed pressure and/or temperature are displayed to the operator when the vehicle is moving, i.e. the wheel rotating relative to the body of the vehicle. Such devices are generally relatively complex and expensive or alternatively are not particularly robust.

Some tire pressure and/or temperature sensor systems incorporate a sensor that is fixed to the body so no rotating electrical contact between the rotating wheel and the chassis is required. In this system, a sensor rod is deflected by contact with the tire sidewall when the sidewall of the tire is deformed as occurs when the tire pressure is low. This system provides an indication of low tire pressure but is not robust. For example mud or other debris on the wheels may cause faulty readings. Furthermore, this system provides an indication only when the tire pressure is reduced significantly as is necessary for significant tire bulge to occur. Clearly such a system simply cannot provide a reading of actual tire pressure.

In another form of fixed sensor the height of the vehicle can be detected and when the height is reduced, it is deemed tire pressure is low. However, if the tire in a rut or is parked on uneven ground, a faulty low-pressure reading is likely to be generated.

More complicated systems are capable of monitoring tire pressure. For example, some pressure sensor systems utilize a rotating encoder formed by a multi-polar ring of magnetic segments of different polarity that are distributed circumferentially in a regular and alternating manner. A transmitter coil coaxial with the ring and a fixed pickup (an induction coil system) is energized by alternating electrical current flowing through the transmitter coil to generate a magnetic field superimposed on the magnetic field created by the multi-polar ring generates a signal picked up and delivers a signal relating the rotating characteristic of the wheel and thus, the state of the tire.

Some tire pressure systems also utilize a wheel system wherein each sensor on each wheel is provided with a radio transmitter that transmit the information on tire pressure, etc. from the wheel to a radio receiver on the body of the vehicle and this transmitted signal is decoded to provide information on tire pressure etc. and makes it available to the operator. Conventional wireless systems, however, are not durable and are expensive to design and produce.

One type of sensor that has found wide use in pressure and temperature sensing applications, such as, vehicle tires, is the Surface Acoustic Wave (SAW) sensors, which can be composed of a sense element on a base and pressure transducer sensor diaphragm that is part of the cover. For a SAW sensor to function properly, the sensor diaphragm should generally be located in intimate contact with the sense element at all pressure levels and temperatures.

One of the problems with current SAW sensor designs, particularly those designs adapted to tire pressure and temperature sensing applications, is the inability of conventional SAW sensing systems to meet the rigorous environment within the tire itself. Such systems are inherently expensive, awkward, and often are not reliable in accurately sensing tire air pressure and temperature. It is therefore believed that a solution to such problems involves a low cost SAW sensor packaging system, which can be integrated into a tire and interrogated wirelessly. Such a system is described in greater detail herein.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for improved sensor devices, methods and systems.

It is another aspect of the present invention to provide for an improved sensor integrated circuit package.

It is yet another aspect of the present invention to provide for an encapsulated surface acoustic wave sensor.

It is still a further aspect of the present invention to provide for a quartz sensor integrated circuit package that includes said encapsulated surface acoustic wave sensor for use in sensing temperature and pressure within harsh environments such as a tire.

The aforementioned aspects of the invention and other objectives and advantages can now be achieved as described herein. Sensor package systems and methods are disclosed, which include a quartz sensor package encapsulated by an overmold material. A surface acoustic wave sensing element and one or more bonding pads can be integrated with the quartz sensor package. Additionally, one or more antennas can be respectively bonded to the quartz sensor package at the bonding pads, such that the antennas communicates electrically with the surface acoustic wave sensing element and permits wireless interrogation of the quartz sensor package including the surface acoustic wave sensing element from an external wireless source.

Each bonding pad can be configured as a thermo-compression bond, solder bonded, conductive adhesive bonded, or by other means. Each antenna can be implemented as an antenna ribbon and/or a flexible circuit antenna. Additionally, a ribbon bond stress-relief gel can be located between the antenna ribbon and/or flexible circuit antenna and the quartz sensor package. The quartz sensor package can be configured to include a sensor diaphragm, which is incorporated with and/or associated with the surface acoustic wave sensing element.

A pressure access cavity can also be formed from the sensor diaphragm and filled with a non-compressible gel in order to transfer air pressure from an external pressure source such as, for example, a tire, to the sensor diaphragm. The quartz sensor package itself can be configured as an integrated circuit (IC) package. Such an IC package can be integrated into a tire, such that the quartz sensor package measures air pressure and air temperature within the tire.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1 illustrates a top view of a sensor package system, which can be implemented in accordance with a preferred embodiment of the present invention;

FIG. 2 illustrates a polymide film flexible printed circuit, which can be adapted for use with the antenna of the sensor package system depicted in FIG. 1, in accordance with a preferred embodiment of the present invention;

DETAILED DESCRIPTION OF THE INVENTION

Figure 3:
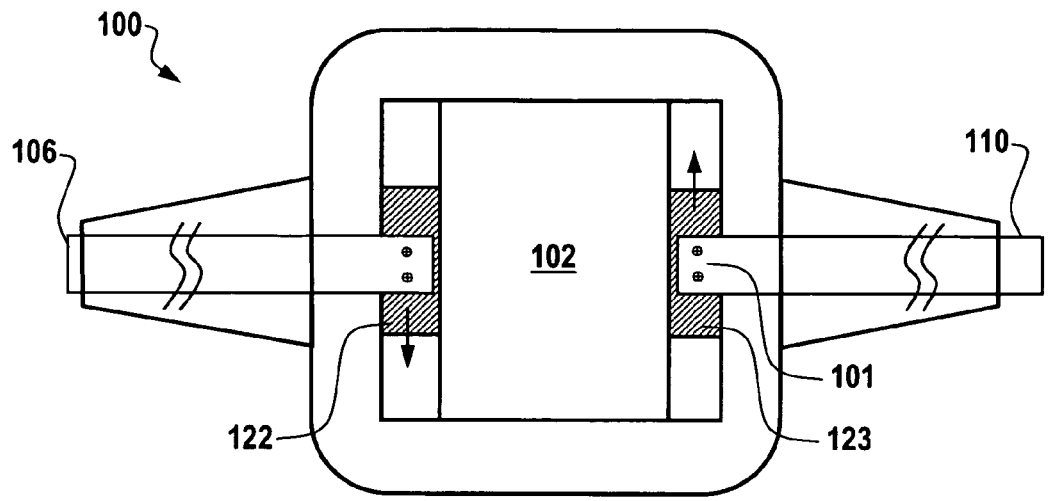
FIG. 3 illustrates a top view of a sensor package system, which can be implemented in accordance with an alternative embodiment of the present invention.

The particular values and configurations discussed in these non-limiting examples can be varied and are cited merely to illustrate at least one embodiment of the present invention and are not intended to limit the scope of the invention.

FIG. 1 illustrates a top view of a sensor package system 100, which can be implemented in accordance with a preferred embodiment of the present invention. FIG. 2 illustrates a flexible printed circuit antenna 200, which can be adapted for use with the used in the sensor package system 100 of FIG. 1, in accordance with a preferred embodiment of the present invention. Flexible printed circuit antenna 200 can be formed from a polyimide film material such as, for example, Kapton® Note that in FIGS. 1–5, identical or similar parts are generally indicated by identical reference numerals. Thus, system 100 can include a quartz sensor package 102 and one or more bonding pads 101, which can be integrated with the quartz sensor package 102. Bonding pad 101 can be implemented as a thermocompression bond. Quartz sensor system 100 can be encapsulated by an overmold 104.

System 100 also includes one or more antennas 106 and 110, which can be respectively bonded to the quartz sensor package 102 at the bonding pads 101 to thereby form bonding pad-to-antenna connections 101 such that the antennas 106 and 110 communicate electrically with a surface acoustic wave (SAW) sensing element integrated into quartz sensor package 102. In other words, quartz sensor package 102 can be configured from one or more SAW sensing elements. Such a configuration therefore permits wireless interrogation of the quartz sensor package 102 including the surface acoustic wave sensing element from an external wireless source, such as, for example, a wireless data transmitter and receiver device, which is located external to system 100. Overmold 104 encapsulates the bonding pad-to-antenna connections 101 as shown in FIG. 1. Antennas 106 and 110 can be printed on a polymide substrate (112) such as, for example, Kapton®. Antennas 106 and 110 can therefore constitute flexible circuit antenna configurations and/or antenna ribbons. Antennas 106 and 110 can be printed onto a substrate 112 (or tape) formed from a polyimide film material such as, for example, Kapton®

Note that as utilized herein, the term Kapton® refers generally to a high-performance polyimide film material that is utilized in the electronics arts. Kapton® is a trademark of the E. I. DuPont de Nemours and Company. It can be appreciated that other types of polyimide films can be utilized in place of Kapton® in accordance with alternative embodiments. The use of Kapton® is therefore discussed herein for general illustrative and edification purposes only and is not considered a limiting feature of the embodiments disclosed herein.

Figure 4:
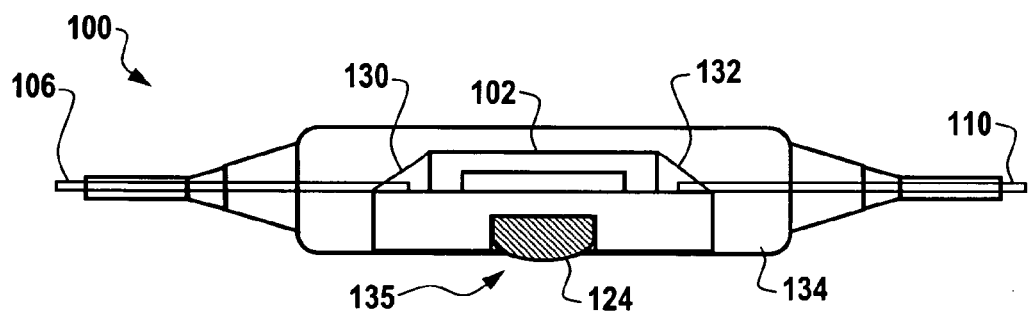
FIG. 4 illustrates a side view of a sensor package system, which can be implemented in accordance with an alternative embodiment of the present invention.
Figure 5:
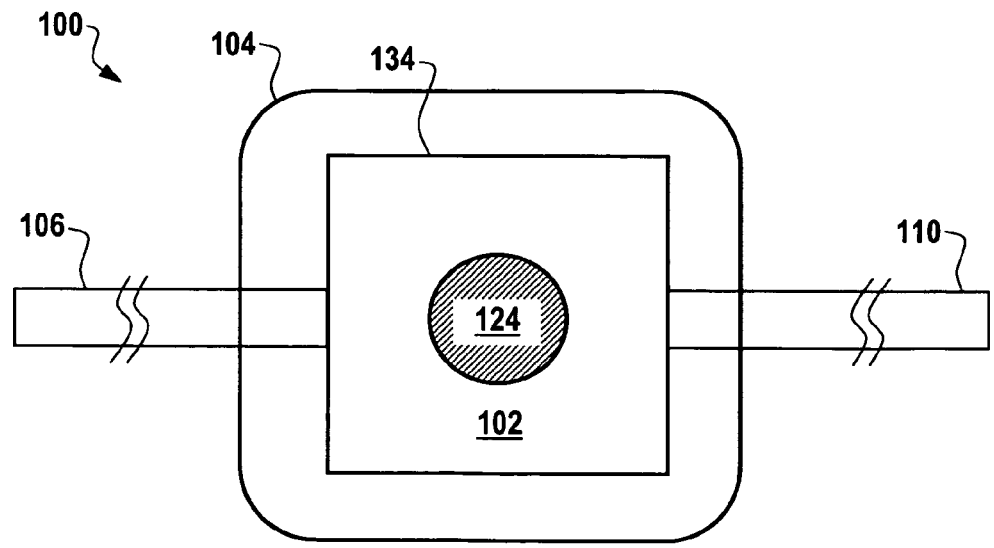
FIG. 5 illustrates a bottom view of a sensor package system, which can be implemented in accordance with an alternative embodiment of the present invention.

FIG. 3 illustrates a top view of sensor package system 100, which can be implemented in accordance with an alternative embodiment of the present invention. FIG. 4 illustrates a side view of sensor package system 100, in accordance with an alternative embodiment of the present invention. Similarly, FIG. 5 illustrates a bottom view of sensor package system 100, in accordance with an alternative embodiment of the present invention. System 100 depicted in FIGS. 3–5 therefore represents an alternative embodiment or modified version of system 100 depicted in FIGS. 1–2.

System 100 of FIG. 3 can be implemented with antennas 106 and 110, which can each be configured as antenna ribbons or wires connected to all-quartz sensor package 102 by one or more bonding pads, such as bonding pad 101. As indicated in FIG. 4, system 100 can also utilize a ribbon bond stress-relief gel 130 (i.e., if required). System 100 can further include a SAW sensor diaphragm 134 formed about a pressure access cavity 135, which can be filled with a non-compressible gel 124 in order to transfer air pressure from an external pressure source (e.g., a tire) to said SAW sensor diaphragm 134. A sealed reference pressure area 132 can be located between SAW sensor diaphragm 134 and quartz sensor package 102, as depicted in FIG. 4. As indicated in FIG. 5, overmold 104 surrounds quartz sensor package 102 and gel 124. A suggested size of the molded encapsulation (i.e., overmold 104) is approximately 10 mm×10 mm×1 mm.

In general, system 100 can be configured as an All Quartz Package (ACP), such that any SAW sensor elements thereof do not require calibration, thereby eliminating Radio Frequency Identification (RFID) components, such as, for example, RFID tags. The AQP can be over molded (e.g., see overmold 104) utilizing standard silicon microelectronic chip packaging processes. Material for overmold 104 can be selected to be compatible with rubber materials and tire manufacturing. Standard ribbon bonding interconnection or soldering processes can also be utilized to attach ribbon or wire style antennas (e.g., see antennas 106 and 110) to the chip bonding pads (e.g., see bonding pad 101). Silicone-based gel 124 can be utilized to transfer pressure from an inner tube of a tire to the SAW sensor diaphragm 134.

Figure 6:
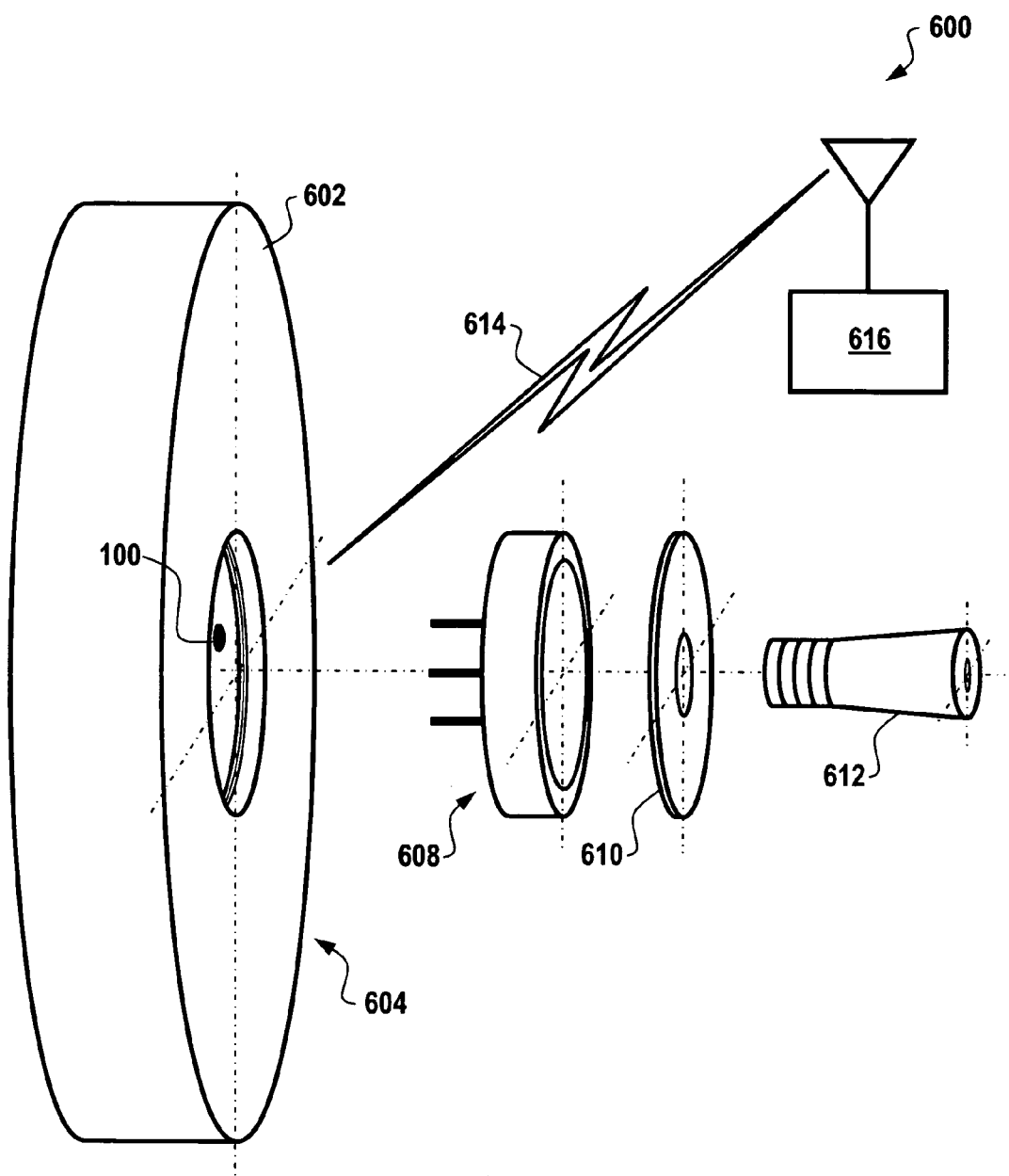
FIG. 6 illustrates an exploded view a tire sensor system, which can be implemented in accordance with an alternative embodiment of the present invention.

FIG. 6 illustrates an exploded view a tire sensor system 600, which can be implemented in accordance with an alternative embodiment of the present invention. System 600 can be implemented in the context of a tire 602 associated with, for example, a drum-type brake. It can be appreciated, however, that system 600 can be implemented in the context of other brake systems, such as disk brakes, and that the drum-type brake configuration is presented herein for general illustrative and edification purposes only. Tire 600 generally includes a tire rim 604. System 600 includes a brake drum 606, which can interact with a backing plate 610, which in turn surrounds a vehicle axle 612.

System 600 also incorporates sensor system 100, which is described in greater detail herein with respect to FIGS. 1–5. System 600 can be utilized to monitor the temperature and pressure of tire 602 by locating system 100 at a particular location within or on tire 602. In general, system 100 can be placed into tire 602 prior to tire molding thereof. System 100 can then be "cured into" tire 602. System 100 therefore measures air pressure and temperature inside tire 602.

A wireless signal (e.g., radio frequency, low frequency, etc.) can be transmitted to system 100 from a transmitter/receiver 616, which can be located within an automobile and/or elsewhere. The signal excites system 100. Pressure and air temperature data can then be transmitted back to transmitter/receiver 616 for further collection and evaluation.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The invention claimed is:

1. A sensor package system, comprising:
   a quartz sensor package including a surface acoustic wave sensing element and at least one bonding pad both of which are integrated with said quartz sensor package, wherein said quartz sensor package comprises a sensor diaphragm comprising said surface acoustic wave sensing element;
   a pressure access cavity formed from said sensor diaphragm and filled with a non-compressible gel in order to transfer air pressure from an external pressure source to said sensor diaphragm;
   at least one antenna respectively bonded to said quartz sensor package at said at least one bonding pad to thereby form at least one bonding pad-to-antenna connection such that said at least one antenna communicates electrically with said surface acoustic wave sensing element and permits wireless interrogation of said quartz sensor package including said surface acoustic wave sensing element from an external wireless source; and
   an overmold material encapsulating said quartz sensor package including said at least one bonding pad-to-antenna connection.

2. The system of claim 1 wherein said at least one bonding pad comprises at least one of the following types of bonds: a thermo-compression bond, a solder bond, or an adhesive bond.

3. The system of claim 1 wherein said at least one antenna comprises an antenna ribbon or wire.

4. The system of claim 1 wherein said quartz sensor package is configured as an all-quartz package (ACP).

5. The system of claim 4 further comprising a ribbon bond stress-relief gel located between said antenna ribbon and said all-quartz package.

6. The system of claim 1 said at least one antenna comprises a flexible printed circuit antenna.

7. The system of claim 1 wherein said quartz sensor package comprises an integrated circuit (IC) package.

8. The system of claim 7 wherein said IC package is integrated into a tire, such that said sensor package measures air pressure and air temperature within said tire.

9. A tire sensor package system, comprising:
   a tire in which a quartz sensor integrated circuit (IC) package is located, said quartz sensor IC package including a surface acoustic wave sensing element and at least one bonding pad integrated with said quartz sensor IC package; and
   wherein said quartz sensor IC package comprises a sensor diaphragm comprising said surface acoustic wave sensing element and wherein a pressure access cavity is formed from said sensor diaphragm and filled with a non-compressible gel in order to transfer air pressure within said tire to said sensor diaphragm;
   at least one antenna respectively bonded to said quartz sensor IC package at said at least one bonding pad to thereby form at least one bonding pad-to-antenna connection such that said at least one antenna communicates electrically with said surface acoustic wave sensing element and permits wireless interrogation of said quartz sensor IC package including said surface acoustic wave sensing element from an external wireless source; and
   an overmold material encapsulating said quartz sensor IC package including said a at least one bonding pad-to-antenna connection, wherein said quartz sensor IC package is integrated into said tire such that said quartz sensor package measures air pressure and air temperature within said tire.

10. A sensor packaging method, comprising the steps of:
    providing a quartz sensor package;
    integrating a surface acoustic wave sensing element and at least one bonding pad with said quartz sensor package;
    configuring said quartz sensor package to comprise a sensor diaphragm that incorporates said surface acoustic wave sensing element;
    forming a pressure access cavity from said sensor diaphragm;
    filling said pressure access cavity with a non-compressible gel in order to transfer air pressure from an external pressure source to said sensor diaphragm;
    respectively bonding at least one antenna to said quartz sensor package at said at least one bonding pad to thereby form at least one bonding pad-to-antenna connection, such that said at least one antenna communicates electrically with said surface acoustic wave sensing element and permits wireless interrogation of said quartz sensor package including said surface acoustic wave sensing element from an external wireless source; and encapsulating a quartz sensor package including said at least one bonding pad-to-antenna connection with an overmold material.

11. The method of claim 10 further comprising the step of configuring said quartz sensor as an all-quartz package (AQP).

12. The method of claim 10 further comprising the step of configuring said at least one antenna to comprise an antenna ribbon.

13. The method of claim 12 further comprising the step of locating a ribbon bond stress-relief gel between said antenna ribbon and said quartz sensor package.

14. The method of claim 10 further comprising the step of configuring said at least one antenna to comprise a flexible printed circuit antenna.

15. The method of claim 10 wherein said quartz sensor package comprises an integrated circuit (IC) package and further comprising the steps of:

placing said IC package into a tire prior to molding of said tire; and integrating said IC package into said tire, such that said quartz sensor package is capable of measuring air pressure and air temperature within said tire.

\* \* \* \* \*